United States Patent
Lee et al.

(10) Patent No.: US 12,022,232 B2
(45) Date of Patent: Jun. 25, 2024

(54) RECEIVER DEVICE AND SIGNAL PROCESSING METHOD

(71) Applicant: Realtek Semiconductor Corp., HsinChu (TW)

(72) Inventors: Shun-Rong Lee, HsinChu (TW); Wen-Yu Huang, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 54 days.

(21) Appl. No.: 18/097,277

(22) Filed: Jan. 15, 2023

(65) Prior Publication Data
US 2023/0283746 A1 Sep. 7, 2023

(30) Foreign Application Priority Data
Mar. 4, 2022 (TW) .................................. 111108011

(51) Int. Cl.
*H04N 7/08* (2006.01)
*H04L 1/00* (2006.01)

(52) U.S. Cl.
CPC ......... *H04N 7/0803* (2013.01); *H04L 1/0061* (2013.01)

(58) Field of Classification Search
CPC ........... H04N 7/0803; H04N 21/42676; H04N 21/4382; H04N 21/4263; H04N 21/4383; H04L 1/0061; H04L 27/0014; H04L 1/0045; H04L 1/201
See application file for complete search history.

(56) References Cited

U.S. PATENT DOCUMENTS

| | | | | |
|---|---|---|---|---|
| 10,944,616 B1 * | 3/2021 | Huang | ................... | H04L 5/0048 |
| 2009/0147873 A1 * | 6/2009 | Li | ....................... | H04L 27/2676 375/260 |
| 2010/0118990 A1 * | 5/2010 | Lee | .................... | H04L 27/2656 375/260 |
| 2010/0202546 A1 * | 8/2010 | Ruan | .................. | H04L 25/0212 375/326 |

(Continued)

FOREIGN PATENT DOCUMENTS

| EP | 2768190 A2 * | 8/2014 | ......... H04L 25/0204 |
|---|---|---|---|
| EP | 2775682 A2 * | 9/2014 | ......... H04L 27/2656 |

*Primary Examiner* — Michael Lee
(74) *Attorney, Agent, or Firm* — Winston Hsu

(57) ABSTRACT

A signal processing method for processing a signal received by a receiver device includes: performing a first correlation calculation on the received signal to obtain a first calculation result; performing carrier frequency offset estimation and compensation on the received signal to obtain a first compensated signal; performing a second correlation calculation on the first compensated signal to obtain a second calculation result; performing carrier frequency offset compensation on the first compensated signal to obtain a second compensated signal; determining whether at least one phase of the second compensated signal is correct; and determining whether at least one decoding result of the second compensated signal is correct. The received signal is determined not a signal conforming to a predetermined standard when the at least one phase of the second compensated signal or the at least one decoding result of the second compensated signal is determined incorrect.

14 Claims, 6 Drawing Sheets

(56) References Cited

U.S. PATENT DOCUMENTS

2011/0007854 A1* 1/2011 Li .................... H04L 27/2659
375/344
2015/0172086 A1* 6/2015 Khoshgard ......... H04L 27/2646
375/260

* cited by examiner

RECEIVER DEVICE AND SIGNAL PROCESSING METHOD

BACKGROUND OF THE INVENTION

1. Field of the Invention

The invention relates to a receiver device, more particular to a receiver device capable of speeding up the determination of whether a specific signal is transmitted in a channel during a signal processing procedure.

2. Description of the Prior Art

ATSC 3.0, also known as the specification of Next Generation Television, is a standard specification for television broadcasting developed by the Advanced Television Systems Committee (ATSC). The countries currently adopting the ATSC 3.0 standard include the United States and South Korea.

Taking the frequency range of the ATSC 3.0 A325 standard as an example, the frequency range of the ATSC 3.0 receiving (RX) frequency band is 54 MHz to 698 MHz, and the bandwidth of each channel is 6 MHz, a total of 50 channels. For ATSC 3.0 receivers, since the number of channels used in each area and the center frequency of each channel are not the same, when the receiver is powered on for the first time or when the receiver moves to a new area, it must perform a full scan for scanning all channels within the frequency range of the ATSC 3.0 receiving band to confirm in which channels the ATSC 3.0 signals appear.

However, the channel scan in existing design is quite a time-consuming operation. Therefore, how to speed up the channel scanning operation has become a problem eagerly to be solved during the development of ATSC 3.0 technology.

SUMMARY OF THE INVENTION

It is an objective of the invention to speed up the channel scanning operation in ATSC 3.0.

According to an embodiment of the invention, a receiver device comprises an antenna device and a signal processing device. The antenna device is configured to receive a signal as a received signal. The signal processing device is configured to process the received signal to determine whether the received signal is a signal conforming to a predetermined standard. The signal processing device is configured to sequentially perform a plurality of operations comprises: performing a first correlation calculation on the received signal to obtain a first calculation result; performing carrier frequency offset estimation and compensation on the received signal according to the first calculation result to obtain a first compensated signal; performing a second correlation calculation on the first compensated signal to obtain a second calculation result; performing carrier frequency offset compensation on the first compensated signal according to the second calculation result to obtain a second compensated signal; determining whether at least one phase of the second compensated signal is correct; and determining whether at least one decoding result of the second compensated signal is correct when the at least one phase of the second compensated signal is determined correct. When the at least one phase of the second compensated signal is determined incorrect or the at least one decoding result of the second compensated signal is determined incorrect, the signal processing device determines that the received signal is not the signal conforming to the predetermined standard.

According to an embodiment of the invention, a signal processing method for processing a received signal received by a receiver device to determine whether the received signal is a signal conforming to a predetermined standard comprises: performing a first correlation calculation on the received signal to obtain a first calculation result; performing carrier frequency offset estimation and compensation on the received signal according to the first calculation result to obtain a first compensated signal; performing a second correlation calculation on the first compensated signal to obtain a second calculation result; performing carrier frequency offset compensation on the first compensated signal according to the second calculation result to obtain a second compensated signal; determining whether at least one phase of the second compensated signal is correct; and determining whether at least one decoding result of the second compensated signal is correct when the at least one phase of the second compensated signal is determined correct. When the at least one phase of the second compensated signal is determined incorrect or the at least one decoding result of the second compensated signal is determined incorrect, the received signal is determined not the signal conforming to the predetermined standard.

These and other objectives of the present invention will no doubt become obvious to those of ordinary skill in the art after reading the following detailed description of the preferred embodiment that is illustrated in the various figures and drawings.

DETAILED DESCRIPTION

A problem to be solved in the invention is to speed up the channel scanning operation in the application of ATSC 3.0. Compared with the prior art, in the embodiments of the invention, by using a plurality of determination conditions in signal detection and identification during the signal processing procedure, the receiver is able to determine whether an ATSC 3.0 signal is comprised in the received signal or not much earlier in the channel scanning operation. In this manner, the time required to perform channel scanning is greatly shortened.

Figure 1:
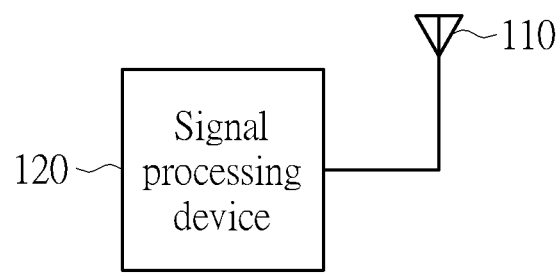
FIG. 1 shows an exemplary block diagram of a receiver device according to an embodiment of the invention.

FIG. 1 shows an exemplary block diagram of a receiver device according to an embodiment of the invention. The receiver device 100 may comprise at least one antenna 110 and a signal processing device 120. It is to be noted that, in order to clarify the concept of the invention, FIG. 1 presents a simplified block diagram of a receiver device in which only the components relevant to the invention are shown. As will be readily appreciated by a person of ordinary skill in the art, a receiver device may further comprise other components not shown in FIG. 1 and configured to implement the functions of wireless communication and related signal processing.

The antenna 110 receives signals, hereinafter referred to as "received signals", from the wireless channels. The signal processing device 120 is configured to process the received signals. The signal processing device 120 may comprise a plurality of signal processing sub-devices or circuits, or signal processing modules, for performing corresponding signal processing on the received signals, and may control the receiving operation of the receiver device 100. In the embodiment of the invention, the signal processing device 120 may control the receiver device 100 to perform a channel scanning operation within a frequency range of a predetermined RX frequency band, so that in the channel scanning operation, the receiver device 100 may switch to the center frequency of each channel to receive signal from the corresponding channel and process the received signal to determine whether the signal received from the channel that the receiver device 100 currently switches to is a signal conforming to a predetermined standard or not.

Figure 2:
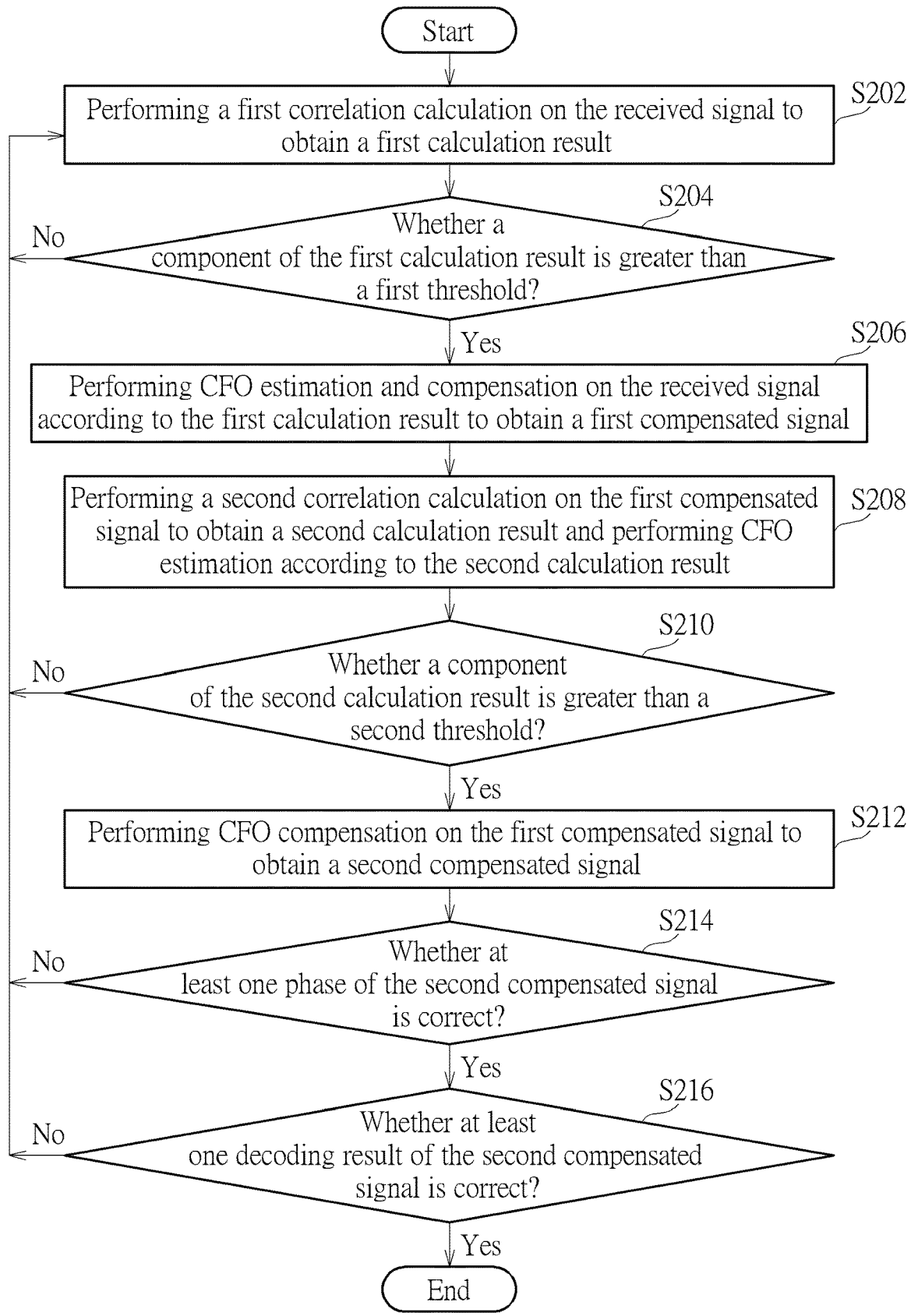
FIG. 2 shows an exemplary flow of a signal processing method according to an embodiment of the invention.

FIG. 2 shows an exemplary flow of a signal processing method according to an embodiment of the invention. The signal processing method comprises the following operations/steps performed by the signal processing device 120 on a received signal received from a channel:

Step S202: performing a first correlation calculation on the received signal to obtain a first calculation result.

Step S204: determining whether a component of the first calculation result is greater than a first threshold. If the determination result shows no, it means that the signal currently being processed is determined not a signal conforming to the predetermined standard, and it is returned to the operation/step S202 to re-perform the first correlation calculation on the received signal. If the determination result shows yes, the operation/step S206 is performed. It is to be noted that in the embodiment of the invention, the received signal is a data stream, and the antenna 110 may be configured to keep receiving signals from the air interface. Therefore, when the operation/step S202 is returned, the signal processing device 120 is configured to re-perform the first correlation calculation on the newly received signal.

Step S206: performing carrier frequency offset estimation and compensation on the received signal according to the first calculation result to obtain a first compensated signal. According to an embodiment of the invention, the carrier frequency offset estimation and compensation performed in the operation/step S206 may be the Fractional Carrier Frequency Offset (FCFO) estimation and compensation.

Step S208: performing a second correlation calculation on the first compensated signal to obtain a second calculation result and performing carrier frequency offset estimation according to the second calculation result. According to an embodiment of the invention, the first correlation calculation and the second correlation calculation may be different types of correlation calculation.

Step S210: determining whether a component of the second calculation result is greater than a second threshold. If the determination result shows no, it means that the signal currently being processed is determined not a signal conforming to the predetermined standard, and it is returned to the operation/step S202 to re-perform the first correlation calculation on the newly received signal. If the determination result shows yes, the operation/step S212 is performed.

Step S212: performing carrier frequency offset compensation on the first compensated signal to obtain a second compensated signal. According to an embodiment of the invention, the carrier frequency offset compensation performed in the operation/step S206 may be the Integer Carrier Frequency Offset (ICFO) compensation. It is to be noted that, in some embodiments of the invention, the ICFO estimation may be performed in operation/step S208 at the same time when the correlation calculation is performed, so as to speed up the signal processing. However, in some other embodiments of the invention, the ICFO estimation may also be performed in operation/step S212 (e.g. may be performed after determining that the component of the second calculation result is greater than the second threshold).

Step S214: determining whether at least one phase of the second compensated signal is correct. If the determination result shows yes, the operation/step S216 is performed. If the determination result shows no, that is, the at least one phase of the second compensated signal is determined incorrect, it means that the signal currently being processed is determined not a signal conforming to the predetermined standard. Therefore, it is returned to the operation/step S202 to re-perform the two-stage correlation calculations and the corresponding CFO estimation and compensation on the received signal as described above.

Step S216: determining whether at least one decoding result of the second compensated signal is correct. If the determination result shows yes, the signal currently being processed is preliminarily determined as a signal conforming to the predetermined standard, and the signal processing device 120 may be configured to perform the subsequent signal processing (which will be introduced in the following paragraphs). If the determination result shows no, that is, the at least one decoding result of the second compensated signal is determined incorrect, it means that the signal currently being processed is determined not a signal conforming to the predetermined standard. Therefore, it is returned to the operation/step S202 to re-perform the two-stage correlation calculations and the corresponding CFO estimation and compensation on the received signal as described above.

In an embodiment of the invention, the predetermined standard may be the aforementioned ATSC 3.0 standard, and the signal processing device 120 may preliminarily determine that ATSC 3.0 signal is comprised in the signal received from the current channel after determining that the decoding result is correct in the operation/step S216. However, it is to be noted that the invention is not limited to the application of ATSC 3.0. The proposed receiver device and the corresponding signal processing method may also be applied in the signal processing procedure for processing the received signal of other standard having similar signal structure.

It is to be further noted that since the received signal is a data stream, the signal processing device 120 may determine that there is no signal conforming to the predetermined standard (as an example, ATSC 3.0) transmitted in the current channel when the signal processing device 120 is unable to determine that the received signal currently being processed is conforming to the predetermined standard after the signal processing device 120 has processed the received signal for a predetermined length or after the signal processing device 120 has performed the aforementioned signal processing for a predetermined period of time. The predetermined length or the predetermined period of time may be related to the transmission period of a specific signal (which will be introduced in the following paragraphs). As an example, assuming that the signal processing device 120 has performed the signal processing for a predetermined period of time when it is (re)performing the operation/step S202, and when it is determined, in the operation/step S214, that the at least one phase of the second compensated signal is incorrect or when it is determined, in the operation/step S216, that the at least one decoding result of the second compensated signal is incorrect, or when it is determined, in the operation/step S204 or S210, that a component of the corresponding calculation result is not greater than the corresponding threshold, the signal processing device 120 may directly determine that the received signal is not a signal conforming to the predetermined standard, or, there is no signal of the predetermined standard (as an example, ATSC 3.0) transmitted in the current channel.

Figure 3:
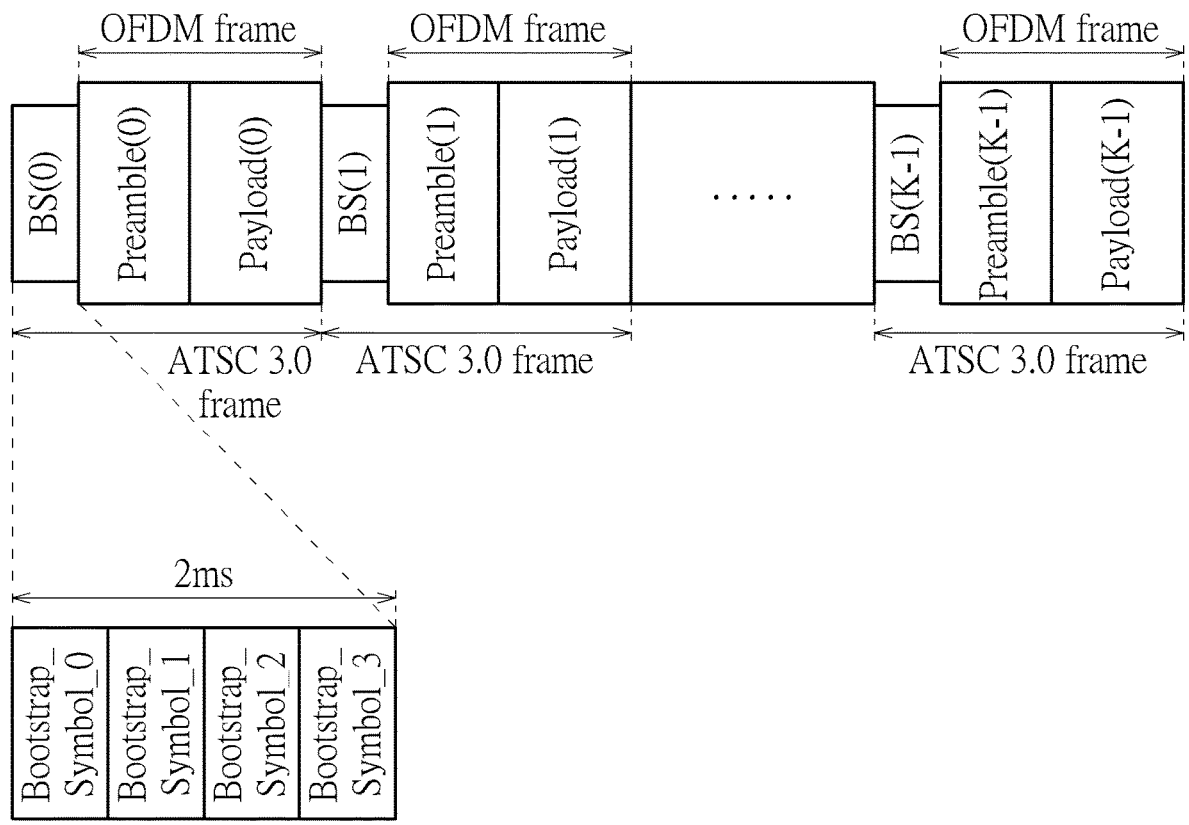
FIG. 3 shows an exemplary signal structure of an ATSC 3.0 frame transmitted by the transmitter according to an embodiment of the invention.

FIG. 3 shows an exemplary signal structure of an ATSC 3.0 frame transmitted by the transmitter according to an embodiment of the invention. Before transmitting each Orthogonal Frequency Division Multiplexing (OFDM) frame, the transmitter adds a bootstrap signal, such as one of the bootstrap signals BS(0), BS(1) . . . BS(K-1), to the OFDM frame to form an ATSC 3.0 frame, where K is a positive integer.

According to the signal transmission sequence of the transmitter defined by the ATSC 3.0 standard in the corresponding ATSC 3.0 specification, the signal frame of the transmission (TX) signal is composed of one or more ATSC 3.0 frames, and each ATSC 3.0 frame is composed of a Bootstrap signal, a Preamble Symbol and a Sub-frame. The duration of each Bootstrap signal is 2 milliseconds, and the Bootstrap signal may comprise 4 Bootstrap symbols, such as Bootstrap_Symbol_0, Bootstrap_Symbol_1, Bootstrap_Symbol_2 and Bootstrap_Symbol_3 shown in FIG. 3, and each has duration of 0.5 milliseconds.

Each Preamble Symbol, such as the Preamble Symbol Preamble(0), Preamble(1), Preamble(K-1) shown in FIG. 3, is composed of the L1-Basic signal and the L1-Detail signal, and the remaining space of the last Preamble Symbol in each ATSC 3.0 frame may be utilized to continuously transmit the Data Symbol of the sub-frame. Each sub-frame is composed of data symbols, forming the payload portion of the ATSC 3.0 frame, such as the data payload Payload(0), Payload(1) . . . Payload(K-1) shown in FIG. 3.

Figure 4:
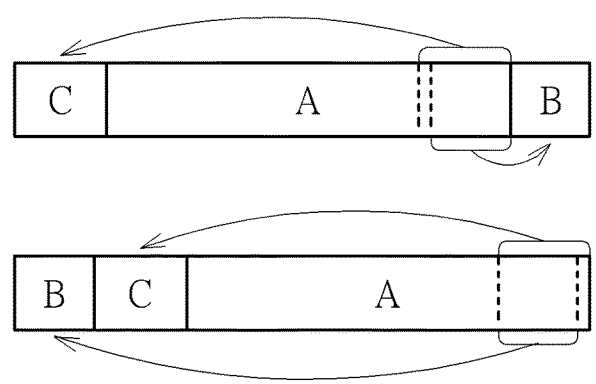
FIG. 4 shows the structure of a Bootstrap symbol defined in the ATSC 3.0 specification.

FIG. 4 shows the structure of a Bootstrap symbol defined in the ATSC 3.0 specification in compliance with the ATSC 3.0 standard. According to the definition in the ATSC 3.0 specification, the time domain structure of the first Bootstrap symbol Bootstrap_Symbol_0 is CAB, and the time domain structure of the remaining bootstrap symbols Bootstrap_Symbol_1~Bootstrap_Symbol_3 is BCA, where A, B, and C are fixed patterns, and the pattern B and the pattern C is a copy of a portion of pattern A (e.g., the portion framed by the box in FIG. 4). In addition, in the Bootstrap signal, the first three Bootstrap symbols Bootstrap_Symbol_0~ Bootstrap_Symbol_2 have the same phase, and there is a 180-degree phase difference between the third Bootstrap symbol Bootstrap_Symbol_2 and the fourth Bootstrap symbol Bootstrap_Symbol_3, thereby indicating the end position of the Bootstrap signal.

Therefore, in the embodiment of the invention, in the operation/step S214, the signal processing device 120 may determine whether at least one phase of the compensated signal is correct based on the phase characteristics of the Bootstrap symbols defined in compliance with the ATSC 3.0 standard (that is, the first three Bootstrap symbols have the same phase, and there is a 180-degree phase difference between the third Bootstrap symbol and the fourth Bootstrap symbol).

In addition, in the embodiments of the invention, different types and two stages of correlation calculation are utilized, which comprises a first stage of delay correlation calculation (e.g. the aforementioned first correlation calculation) and a second stage of cyclic correlation calculation (e.g. the aforementioned second correlation calculation). Assuming that there is a carrier frequency offset (CFO) in the currently received signal, which is a X.Y frequency span of Fast Fourier Transform (FFT), where the integer portion (X) is referred to as the Integer CFO and the fractional portion (Y) is referred to as the Fractional CFO. The signal processing device 120 may obtain an estimation result of the factional CFO according to the calculation result of the delay correlation before performing the CFO compensation in the operation/step S206, and then perform the factional CFO compensation on the received signal according to the estimation result of the factional CFO. In addition, the signal processing device 120 may obtain an estimation result of the integer CFO according to the calculation result of the cyclic correlation in the operation/step S208 or S212 and then perform the integer CFO compensation on the factional CFO compensated signal (e.g. the aforementioned first compensated signal) according to the estimation result of the integer CFO to obtain the integer CFO compensated signal (e.g. the aforementioned second compensated signal).

Details of the proposed signal processing method are further described in the following paragraphs.

Figure 5:
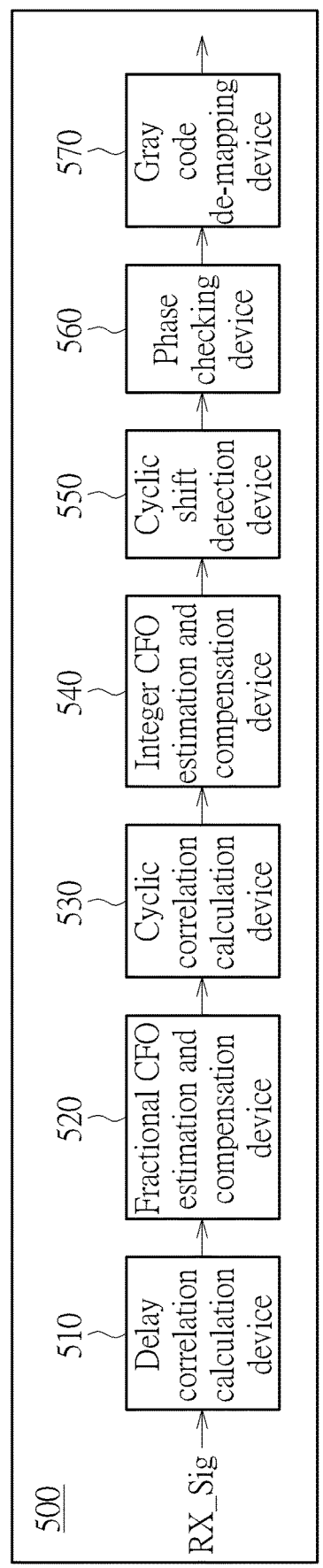
FIG. 5 shows an exemplary block diagram of a signal processing device according to an embodiment of the invention.

FIG. 5 shows an exemplary block diagram of a signal processing device, for illustrating the plurality of signal processing sub-devices or circuits (or may be implemented as signal processing modules) configured in the signal processing device to perform the corresponding signal processing on the received signals in the channel scanning operation, according to an embodiment of the invention. The signal processing device 500 may comprise a delay correlation calculation device 510, a fractional CFO estimation and compensation device 520, a cyclic correlation calculation device 530, an integer CFO estimation and compensation device 540, a cyclic shift detection device 550, a phase checking device 560 and a Gray code de-mapping device 570.

Figure 6:
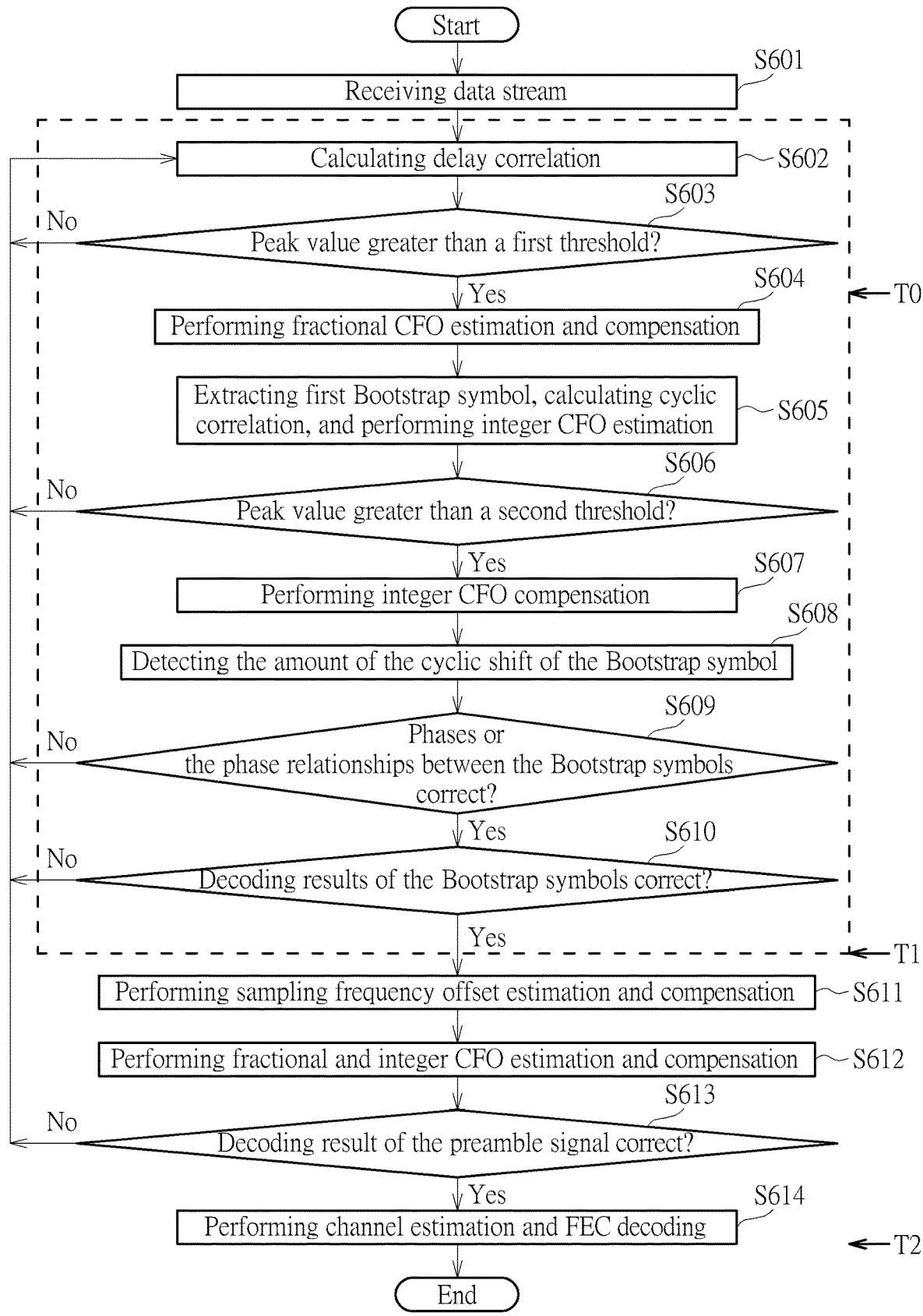
FIG. 6 shows a detailed flow of a signal processing method performed by the signal processing device on the received signal received from a channel according to an embodiment of the invention.

FIG. 6 shows a detailed flow of a signal processing method performed by the signal processing device on the received signal which is received from a channel according to an embodiment of the invention. The proposed signal processing method will be described in detail with reference to the combination of FIG. 5 and FIG. 6.

Step S601: Receiving signals from the antenna. In the embodiment of the invention, the received signal is a data stream. Therefore, the antenna 110 may be configured to keep receiving signals from the air interface and the signal processing device may keep receiving the signals from the antenna.

Step S602: Performing a delay correlation calculation on the received signal RX_Sig by the delay correlation calculation device 510 to obtain a calculation result of delay correlation, wherein the calculation result may be represented by a sequence of complex numbers.

Figure 7:
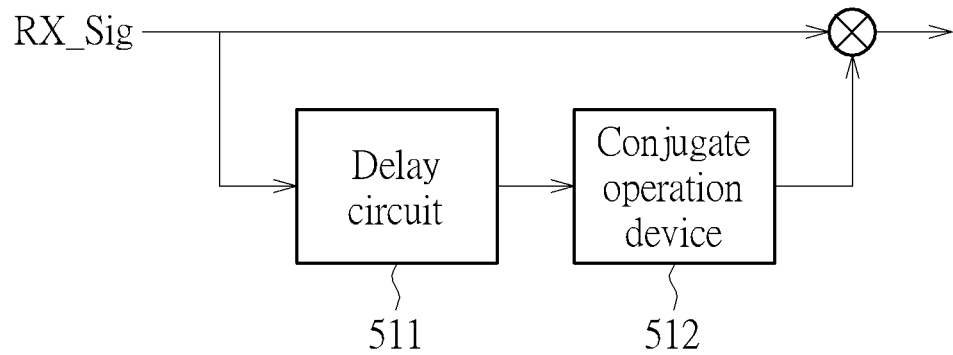
FIG. 7 is a schematic diagram showing the calculation of delay correlation according to an embodiment of the invention.

FIG. 7 is a schematic diagram showing the calculation of delay correlation according to an embodiment of the invention. The delay circuit 511 is configured to delay the received signal RX_Sig according to a predetermined amount of delay, and the conjugate operation device 512 is configured to perform a conjugate operation on the delayed received signal to obtain the complex conjugate thereof, and then the received signal RX_Sig and the complex conjugate of the delayed received signal are multiplied together to obtain the corresponding calculation result of the delay correlation.

The delay correlation calculation device 510 may generate a sequence of values, which are complex numbers as described above, of delay correlation comprising a plurality of calculated delay correlations as the calculation result of delay correlation, and may take the absolute values of the sequence of complex numbers to obtain the amplitude component of the delay correlations and find out the peak value from the amplitude component of the delay correlations (hereinafter referred to as the peak value of the amplitude components).

Step S603: Determining whether the peak value of the amplitude component of the delay correlations is greater than a first threshold by the delay correlation calculation device 510. If the determination result shows no, the process returns to step S602 and the delay correlation calculation device 510 may perform the delay correlation calculation on the received signal RX_Sig, again. As described above, the antenna 110 may be configured to keep receiving signals from the air interface, and thus the content of the received signal RX_Sig will be continuously updated in response to the operation of the antenna. Therefore, when returning to step S602, the delay correlation calculation device 510 performs the delay correlation calculation on the newly received signal RX_Sig. On the other hand, when the peak value of the amplitude component of the delay correlations is greater than the first threshold, step S604 is performed.

Step S604: Obtaining the estimation result of fractional CFO according to the calculation result of the delay correlation and performing fractional CFO compensation on the received signal RX_Sig according to the estimation result of the factional CFO by the fractional CFO estimation and compensation device 520. In an embodiment of the invention, the fractional CFO estimation and compensation device 520 may obtain the estimation result of the factional CFO by taking the phase component of the calculation result of the delay correlation and performing some calculation on the phase component. As those skilled in the art may have the knowledge of various methods for obtaining the estimation result of CFO based on the phase component of the results of correlation calculation, the detailed description is omitted here for brevity.

After obtaining the estimation result of the factional CFO, the fractional CFO estimation and compensation device 520 may perform the frequency adjustment in an opposite direction on the received signal RX_Sig according to the estimation result to compensate for the fractional CFO.

It is to be noted that, performance of the fractional CFO estimation and compensation is not limited to be done after the step S603 is performed. In some embodiments of the invention, in order to speed up the signal processing, the estimation of the fractional CFO may also be performed while performing the calculation of delay correlation.

According to an embodiment of the invention, after finding out the peak value, which is greater than the first threshold, of the amplitude component of the delay correlations, the start position of the Bootstrap signal may be confirmed and the Bootstrap symbols may be identified. Therefore, after the start position of the Bootstrap signal is known, such as at the time T0 shown in FIG. 6, the first Bootstrap symbol may be further extracted for subsequent operations.

Step S605: Extracting the first Bootstrap symbol from the signal whose fractional CFO has been compensated and performing the cyclic correlation calculation on the first Bootstrap symbol so as to obtain the calculation result of the cyclic correlation by the cyclic correlation calculation device 530, wherein the calculation result may be represented by a sequence of complex numbers, and performing the integer CFO estimation by the integer CFO estimation and compensation device 540. For example, in an embodiment of the invention, the integer CFO estimation and compensation device 540 may obtain the estimation result of integer CFO according to the amount of shift corresponding to the peak value of the amplitude component of the calculation result of the cyclic correlation. As those skilled in the art may have the knowledge of various methods for obtaining the estimation result of CFO according to the calculation result of the correlation, the detailed description is omitted here for brevity.

Figure 8:
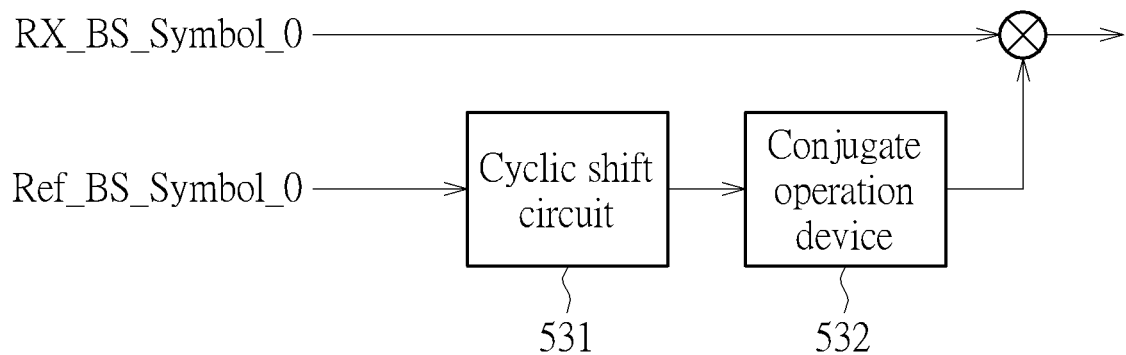
FIG. 8 is a schematic diagram showing the calculation of cyclic correlation according to an embodiment of the invention.

FIG. 8 is a schematic diagram showing the calculation of cyclic correlation according to an embodiment of the invention. Since the content of the Bootstrap symbols is the known information to the receiver, the signal processing device may locally reconstruct the first Bootstrap symbol as a reference Bootstrap symbol Ref_BS_Symbol_0, the cyclic shift circuit 531 may perform cyclic shift on the reference Bootstrap symbol Ref_BS_Symbol_0 and the conjugate operation device 532 may perform a conjugate operation on the cyclically shifted reference Bootstrap symbol to obtain the complex conjugate thereof. Then, the first Bootstrap symbol RX_BS_Symbol_0 which is extracted from the signal whose fractional CFO has been compensated and the complex conjugate of the cyclically shifted reference Bootstrap symbol are multiplied together to obtain the corresponding calculation result of cyclic correlation.

The cyclic correlation calculation device 530 may generate a sequence of values, which are complex numbers as described above, of cyclic correlation comprising a plurality of calculated cyclic correlations as the calculation result of cyclic correlation, and may take the absolute values of the sequence of complex numbers to obtain the amplitude component of the cyclic correlations and find out the peak value from the amplitude component of the cyclic correlations (hereinafter referred to as the peak value of the amplitude component).

Step S606: Determining whether the peak value of the amplitude component of the calculation results of the cyclic correlation is greater than a second threshold by the cyclic correlation calculation device 530. If the determination result shows no, the process returns to step S602 and the delay correlation calculation device 510 performs the delay correlation calculation on the received signal RX_Sig again. If the peak value of the amplitude component is greater than the second threshold value, step S607 is executed.

Step S607: Performing integer CFO compensation on the fractional CFO compensated signal according to the estimation result of integer CFO by the integer CFO estimation and compensation device 540. For example, after obtaining the estimation result of integer CFO, the integer CFO estimation and compensation device 540 may perform frequency adjustment in an opposite direction on the signal that has been fractional CFO compensated according to the estimation result to compensate for the integer CFO.

It is to be noted that the estimation of the integer CFO is not limited to be performed at the same time when performing the calculation of the cyclic correlation in step S605. In some embodiments of the invention, the estimation of the integer CFO may also be arranged in step S607.

Step S608: Detecting the amount of the cyclic shift of the Bootstrap symbol by the cyclic shift detection device 550. The transmitter may perform a cyclic shift on the signaling bits of the Bootstrap symbol, whereby the amount of shift carries synchronization information. The amount of the cyclic shift detected by the receiver may be used when the signal processing device 120/500 performs the subsequent time domain and frequency domain synchronization.

Step S609: Determining whether at least one phase of the signal that has been integer and fractional CFO compensated is correct (or, determining whether the phases or the phase relationships between the Bootstrap symbols are correct) according to the phase characteristics of the Bootstrap symbols defined by the ATSC 3.0 standard in the ATSC 3.0 specification by the phase checking device 560. As mentioned above, in the Bootstrap signal, the first three Bootstrap symbols Bootstrap_Symbol_0~Bootstrap_Symbol_2 have the same phase, and there is a 180-degree phase difference between the third Bootstrap symbol Bootstrap_Symbol_2 and the fourth Bootstrap symbol Bootstrap_Symbol_3. The phase checking device 560 may determine whether the phases of the Bootstrap symbols or the phase relationships between the Bootstrap symbols are correct according to the phase characteristics.

If at least one phase is incorrect, then step S602 is returned and the delay correlation calculation device 510 may perform the delay correlation calculation on the received signal RX_Sig again. If the phases are correct, step S610 is performed. According to an embodiment of the invention, when it is determined that the phases or the phase relationships of the four Bootstrap symbols Bootstrap_Symbol_0~Bootstrap_Symbol_3 are all correct, the phase checking device 560 may determine that the phase of the signal that has been integer and fractional CFO compensated is correct. If at least one phase of the Bootstrap symbols or the phase relationship between any two of the four Bootstrap symbols Bootstrap_Symbol_0~Bootstrap_Symbol_3 is incorrect, the phase checking device 560 may determine that the phase of the signal that has been integer and fractional CFO compensated is incorrect.

Step S610: Decoding the Bootstrap symbols and determining whether the decoding results of the Bootstrap symbols are correct by the Gray code de-mapping device 570. If any of the decoding result is incorrect, then step S602 is returned and the delay correlation calculation device 510 may perform the delay correlation calculation on the received signal RX_Sig again. If the decoding results are correct, step S611 is performed. Since the transmitter uses the Gray code to encode the Bootstrap symbols, the Gray code de-mapping device 570 de-maps the Bootstrap symbols extracted from the integer and fractional CFO compensated signals so as to decode the Bootstrap symbols, and determines whether the decoding results of the Bootstrap symbols are correct in compliance with the content of the Bootstrap symbols defined by the ATSC 3.0 standard in the corresponding ATSC 3.0 specification. For example, the Gray code de-mapping device 570 may determine whether the information regarding system bandwidth obtained by decoding the second Bootstrap symbol Bootstrap_Symbol_1 is the system bandwidth defined in the specification. For another example, the Gray code de-mapping device 570 may determine whether the corresponding relationship between the coefficient obtained by decoding the third Bootstrap symbol Bootstrap_Symbol_2 and the system bandwidth obtained from the second Bootstrap symbol Bootstrap_Symbol_1 is correct. For yet another example, the Gray code de-mapping device 570 may determine whether the preamble symbol structure obtained by decoding the fourth Bootstrap symbol Bootstrap_Symbol_3 belongs to one of the structures defined by the ATSC 3.0 standard in the corresponding ATSC 3.0 specification. According to an embodiment of the invention, when all the decoding results of the Bootstrap symbols Bootstrap_Symbol_1-Bootstrap_Symbol_3 are correct, for example, the contents of the decoded Bootstrap symbols all conform to the contents of the Bootstrap symbols defined in the ATSC 3.0 specification, the Gray code de-mapping device 570 may determine that the decoding results of the Bootstrap symbols are correct. If any information of the decoded Bootstrap symbols does not conform to the contents defined in the ATSC 3.0 specification, it is determined that the decoding results of the Bootstrap symbols are incorrect.

According to an embodiment of the invention, after determining that the decoding results of the Bootstrap symbols are correct, the signal processing device 120/500 may preliminarily determine that there is an ATSC 3.0 signal comprised in the signal RX_Sig received from the current channel, and may continue the signal processing of the remaining portion of the ATSC 3.0 frame. On the other hand, if it is determined in step S603 that the peak value of the delay correlation is not greater than the first threshold, or if it is determined in step S606 that the peak value of the cyclic correlation is not larger than the second threshold, or if it is determined in step S609 that any phase or phase relationship between the Bootstrap symbols is incorrect, or if it is determined in step S610 that any decoding result of the Bootstrap symbol is incorrect, the signal processing device 120/500 may not be able to determine whether there is an ATSC 3.0 signal comprised in the signal RX_Sig received from the current channel yet. Since the Bootstrap signal is transmitted periodically, after processing the received signal RX_Sig for a predetermined length or a predetermined period of time but still unable to preliminarily determine that there is an ATSC 3.0 signal comprised in the received signal RX_Sig, the signal processing device 120/500 may determine that the ATSC 3.0 signal is not transmitted in the current channel and may switch to another channel to perform the signal processing flow as illustrated in FIG. 6 again, wherein the predetermined length or the predetermined period of time may at least equal to the transmission period of the Bootstrap signal. It is to be noted that, in the embodiments of the invention, the aforementioned preliminary determination means that there is a high possibility that the signal RX_Sig received from the current channel comprise or is an ATSC 3.0 signal. However, in the subsequent processing, the signal processing device 120/500 may still modify, after performing some more advanced signal processing, such determination result as that it is unable to determine whether there is an ATSC 3.0 signal comprised in the received signal RX_Sig received from the current channel or modify such determination result as that there is no ATSC 3.0 signal comprised in the received signal RX_Sig received from the current channel. Therefore, in the subsequent signal processing operations, it is still possible to return to step S602 to perform the delay correlation calculation on the newly received signal RX_Sig again.

Step S611: Estimating the sampling frequency offset to obtain a sampling frequency offset estimation result by using the Bootstrap signal locally reconstructed at the receiver and the Bootstrap signal extracted from the received signal RX_Sig, and performing sampling frequency offset compensation on the received signal RX_Sig according to the sampling frequency offset estimation result by a sampling frequency offset estimation and compensation device (not shown in FIG. 5) comprised in the signal processing device. As those skilled in the art may have the knowledge of various methods for calculating the sampling frequency offset estimation result according to the Bootstrap signal, the detailed description is omitted here for brevity.

Step S612: Performing fractional and integer CFO estimation and compensation by using the preamble symbol extracted from the received signal RX_Sig and the data symbols comprised in the sub-frame by a carrier frequency offset estimation and compensation device (not shown in FIG. 5) comprised in the signal processing device. In step S612, more accurate frequency offset estimation may be performed than that performed in steps S604 and S605.

Step S613: Performing Cyclic Redundancy Check (CRC) and linear block code (as an example, the Low-density parity-check (LDPC) code and BCH code) decoding on the preamble symbol by a preamble symbol processing device (not shown in FIG. 5) comprised in the signal processing device and determining whether the CRC check and decoding results of the preamble symbol are correct (e.g., whether the decoding result of the preamble signal is correct). If they are incorrect, it is determined that the ATSC 3.0 signal is not transmitted in the current channel, and step S602 is returned and the delay correlation calculation device 510 may perform the delay correlation calculation on the newly received signal RX_Sig again. If they are correct, step S614 is performed.

Step S614: Performing channel estimation on the preamble symbol and the data symbols of the received signal and performing Forward Error Correction (FEC) decoding on the data symbols by a channel estimation and FEC decoding device comprised in the signal processing device. Since the preamble symbol may carry transmitter parameters, such as the bit rate and modulation mechanism used by the transmitter, after the preamble symbol is successfully decoded, step S614 may be performed by using the transmitter parameters.

When the signal processing device completes the channel scanning operation for scanning all channels, the channel information may be established and recorded.

In the conventional design, since the receiver usually has to use the first ATSC 3.0 frame to parse the transmitter parameters carried by the Bootstrap signal and the preamble symbol, the demodulation and decoding of the data symbol cannot be performed until the second ATSC 3.0 frame is received. In addition, in the conventional design, whether there is an ATSC 3.0 signal transmitted in the current channel can be determined only after a FEC coding block is correctly decoded. Therefore, the conventional design can accurately determine whether there is an ATSC 3.0 signal transmitted in the current channel only when the signal processing goes to the second ATSC 3.0 frame. Especially, the conventional design can accurately determine whether there is an ATSC 3.0 signal transmitted in the current channel only after a FEC coding block is correctly decoded when decoding the second ATSC 3.0 frame. In addition, since both the operations of FEC decoding and error correction require a lot of signal processing time, there is a problem of slow channel scanning operation exists in the conventional design because of that it is unable to detect and identify whether there is an ATSC 3.0 signal transmitted in the current channel in advance in the conventional design.

In the embodiments of the invention, as the signal processing flow shown in FIG. 6, in order to improve the reliability of ATSC 3.0 signal detection and identification, four determination conditions are established, such as determination conditions utilized in steps S603, S606, S609 and S610 (or corresponding to the determination conditions utilized in steps S204, S210, S214 and S216 in FIG. 2). Therefore, in the process of ATSC 3.0 signal detection and identification, if the ATSC 3.0 signal does not exist in the current channel, the processing flow shown in the box drawn by dotted line in FIG. 6 indeed greatly reduce the required signal processing time. That is, by applying the proposed signal processing method, after processing the received signal for a predetermined length or a predetermined period of time, it can be determined at time T1 that there is no ATSC 3.0 signal transmitted in the current channel, without the need to process the second ATSC 3.0 frame as in the conventional design, in which the signal processing has to be performed at least until the time T2 to determine whether there is an ATSC 3.0 signal transmitted in the current channel or not. In other words, for the channel without an ATSC 3.0 signal, the proposed signal processing method is able to greatly reduce the required signal processing time. Taking the frequency range of the ATSC 3.0 A325 standard as an example, the frequency range of the ATSC 3.0 RX frequency band is 54 MHz to 698 MHz, with a total of 50 channels. Assuming that only 10 channels have ATSC 3.0 signals transmitted therein, the proposed signal processing method is able to determine where there is no ATSC 3.0 signal transmitted in a channel earlier than the conventional design, and the signal processing time required in channel scan may be shortened for at least 40 channels, thereby effectively speeding up the channel scanning operation of ATSC 3.0.

Taking another example, if the transmitted signal is a signal defined in the A327 specification, its frame length is 255.33 milliseconds, and the modulation scheme is 256 Quadrature Amplitude Modulation (QAM), the coding rate is 9/15, the time domain interleaving is Convolutional Time Interleaver (CTI) and the depth is 1024. After receiving two complete Bootstrap symbols, the receiver knows the start position of the current ATSC 3.0 frame, such as knowing that at the time TO shown in FIG. 6. Assuming that it takes 255.33 milliseconds to completely receive a frame, and the demodulation and decoding of data symbols will be started only when the second frame is received. In this moment, the deinterleaving in the time domain takes 0.89 frame.

That is to say, besides the signal reception time required before the Bootstrap signal is received, the conventional signal detection and identification method requires (1+0.89)*255.33=482.57 milliseconds to be successfully detect and identify whether there is an ATSC 3.0 signal transmitted the current channel or not, such as at the time T2 shown in FIG. 6. However, when the proposed signal processing which is capable of speeding up the determination of whether there is an ATSC 3.0 signal transmitted the current channel is applied, it takes only 2.5 milliseconds, including the duration of 4 Bootstrap symbols required for decoding the Bootstrap signal and the time about 0.5 milliseconds required for hardware calculation, which is a greatly save of 482.57-2.5=480.07 milliseconds.

Since it is able to determine whether there is an ATSC 3.0 signal transmitted the current channel early at the time T1 after the decoding of Bootstrap signal is completed, which is an estimated time saved for one channel in the proposed signal processing method. When the proposed signal processing method is applied in the full scan procedure, it is predictable that a considerable amount of time can be saved.

Taking the frequency range of the aforementioned ATSC 3.0 A325 standard as an example, there are a total of 50 channels in the ATSC 3.0 RX frequency band. If there is an ATSC 3.0 signal transmitted in a channel, the signal detection and identification for this case is a general process. On the other hand, if there is no ATSC 3.0 signal transmitted in any channel, besides the signal reception time (Wt) that is required for each channel before the Bootstrap signal is received, the time required for signal detection and identification in the full scan procedure in the conventional design is (Wt+482.57)*50=50*Wt+24.13 seconds. As a comparison, when the proposed signal processing method is applied in the full scan procedure, it will take only (Wt+2.5)*50=50*Wt+125 milliseconds, which has greatly shortened the time required when performing a full scan for scanning all channels.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A receiver device, comprising:
    an antenna device, configured to receive a signal as a received signal; and
    a signal processing device, configured to process the received signal to determine whether the received signal is a signal conforming to a predetermined standard, wherein the signal processing device is configured to sequentially perform a plurality of operations comprising:
    performing a first correlation calculation on the received signal to obtain a first calculation result;
    performing carrier frequency offset estimation and compensation on the received signal according to the first calculation result to obtain a first compensated signal;
    performing a second correlation calculation on the first compensated signal to obtain a second calculation result;
    performing carrier frequency offset compensation on the first compensated signal according to the second calculation result to obtain a second compensated signal;
    determining whether at least one phase of the second compensated signal is correct; and
    determining whether at least one decoding result of the second compensated signal is correct when the at least one phase of the second compensated signal is determined correct,
    wherein when the at least one phase of the second compensated signal is determined incorrect or the at least one decoding result of the second compensated signal is determined incorrect, the signal processing device determines that the received signal is not the signal conforming to the predetermined standard.

2. The receiver device of claim 1, wherein the signal processing device is further configured to determine whether a component of the first calculation result is greater than a threshold, and when the component of the first calculation result is greater than the threshold, the signal processing device is configured to perform the carrier frequency offset estimation and compensation on the received signal.

3. The receiver device of claim 2, wherein the received signal is a data stream, and when the component of the first calculation result is not greater than the threshold, the at least one phase of the second compensated signal is determined incorrect or the at least one decoding result of the second compensated signal is determined incorrect, the signal processing device is configured to re-perform the first correlation calculation on the received signal.

4. The receiver device of claim 1, wherein the received signal comprises a plurality of Bootstrap symbols, and the signal processing device is configured to determine whether the at least one phase of the second compensated signal is correct based on phase characteristics of the Bootstrap symbols defined in compliance with the predetermined standard.

5. The receiver device of claim 1, wherein the received signal comprises a plurality of Bootstrap symbols, the signal processing device is configured to identify the Bootstrap symbols according to the first calculation result, and determine whether the at least one decoding result of the second compensated signal is correct by determining whether a decoding result of the Bootstrap symbols is correct.

6. The receiver device of claim 1, wherein the first correlation calculation is a calculation of delay correlation and the second correlation calculation is a calculation of cyclic correlation.

7. The receiver device of claim 1, wherein the predetermined standard is Advanced Television Systems Committee (ATSC) 3.0 standard.

8. A signal processing method for processing a received signal received by a receiver device to determine whether the received signal is a signal conforming to a predetermined standard, comprising:
    performing a first correlation calculation on the received signal to obtain a first calculation result;
    performing carrier frequency offset estimation and compensation on the received signal according to the first calculation result to obtain a first compensated signal;
    performing a second correlation calculation on the first compensated signal to obtain a second calculation result;
    performing carrier frequency offset compensation on the first compensated signal according to the second calculation result to obtain a second compensated signal;
    determining whether at least one phase of the second compensated signal is correct; and
    determining whether at least one decoding result of the second compensated signal is correct when the at least one phase of the second compensated signal is determined correct,
    wherein when the at least one phase of the second compensated signal is determined incorrect or the at least one decoding result of the second compensated signal is determined incorrect, the received signal is determined not the signal conforming to the predetermined standard.

9. The signal processing method of claim 8, further comprising:
    determine whether a component of the first calculation result is greater than a threshold,
    wherein when the component of the first calculation result is greater than the threshold, the carrier frequency offset estimation and compensation is performed on the received signal.

10. The signal processing method of claim 9, wherein the received signal is a data stream, and when the component of the first calculation result is not greater than the threshold, the at least one phase of the second compensated signal is determined incorrect or the at least one decoding result of the second compensated signal is determined incorrect, the first correlation calculation is re-performed on the received signal.

11. The signal processing method of claim 8, wherein the received signal comprises a plurality of Bootstrap symbols, and wherein the determination of whether the at least one phase of the second compensated signal is correct is performed based on phase characteristics of the Bootstrap symbols defined in compliance with the predetermined standard.

12. The signal processing method of claim 8, wherein the received signal comprises a plurality of Bootstrap symbols, and the signal processing method further comprises:
   identifying the Bootstrap symbols according to the first calculation result,
   wherein the determination of whether the at least one decoding result of the second compensated signal is correct is performed by determining whether a decoding result of the Bootstrap symbols is correct.

13. The signal processing method of claim 8, wherein the first correlation calculation is a calculation of delay correlation and the second correlation calculation is a calculation of cyclic correlation.

14. The signal processing method of claim 8, wherein the predetermined standard is Advanced Television Systems Committee (ATSC) 3.0 standard.

* * * * *